Nov. 19, 1929. M. F. BEETHAM ET AL Re. 17,490
DOOR CLOSURE FOR ROTATABLE RECEPTACLES
Original Filed Oct. 16, 1926 2 Sheets-Sheet 1
Fig. 1.
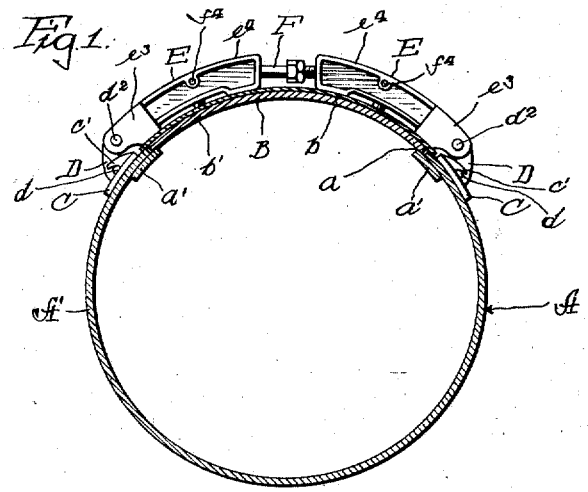
Fig. 2.
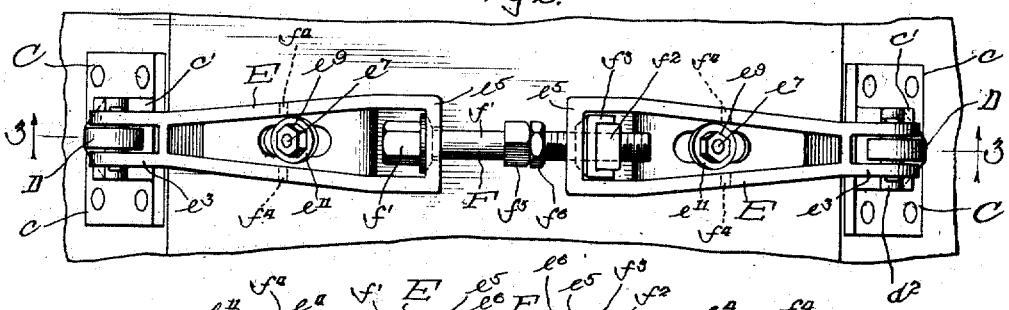
Fig. 3
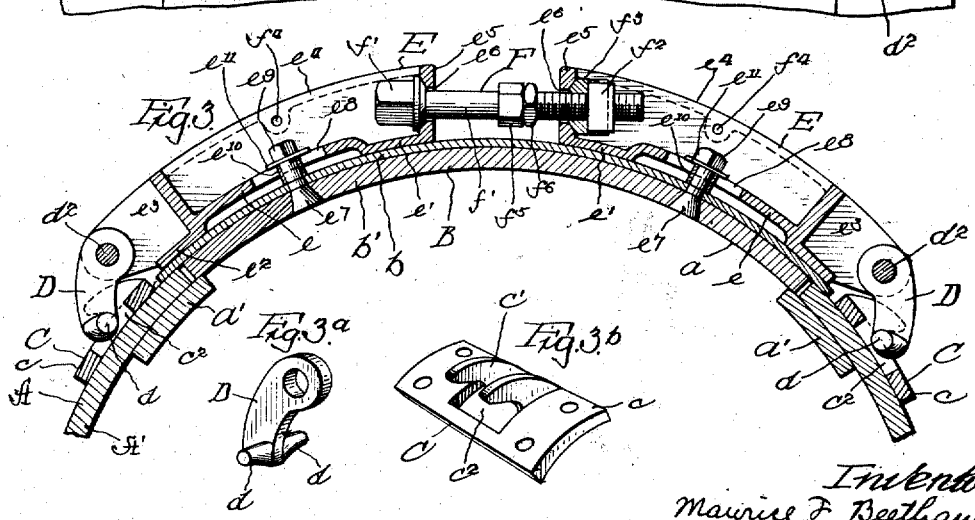
Fig. 3a
Fig. 3b
Inventors:
Maurice F. Beetham
Raymond H. Moore
By Fred Gulach
Atty.

M. F. BEETHAM ET AL

Nov. 19, 1929. DOOR CLOSURE FOR ROTATABLE RECEPTACLES Re. 17,490

2 Sheets-Sheet 2

Original Filed Oct. 16, 1926

Inventor.
Maurice F. Beetham
Raymond H. Moore
By Fred Gerlach
Atty.

Reissued Nov. 19, 1929

Re. 17,490

UNITED STATES PATENT OFFICE

MAURICE F. BEETHAM AND RAYMOND H. MOORE, OF HARVEY, ILLINOIS, ASSIGNORS TO WHITING CORPORATION, OF HARVEY, ILLINOIS, A CORPORATION OF ILLINOIS

DOOR CLOSURE FOR ROTATABLE RECEPTACLES

Original No. 1,630,600, dated May 31, 1927, Serial No. 141,909, filed October 16, 1926. Application for reissue filed September 20, 1928. Serial No. 307,320.

The invention relates to devices for removably securing doors to receptacles, and more particularly to that type in which it is desired to effect a tight closure, and in which the door is subjected to impact, such, for example, as the doors to tumbling receptacles.

The object of the invention is to provide an improved door-closure for a receptacle of this type which, is readily operable to secure or release the door, is adapted to force the door and the receptacle together, and is adapted to reinforce the door when it is closed so that it will be securely held against deformation by impact of the material in the revolving receptacle.

Another object of the invention is to provide a closure of this character which is simple in construction, permits the door to be readily and completely removed and replaced, and is efficient in operation.

The invention consists in the several novel features hereinafter set forth and more particularly defined by claims at the conclusion hereof.

Figure 4:
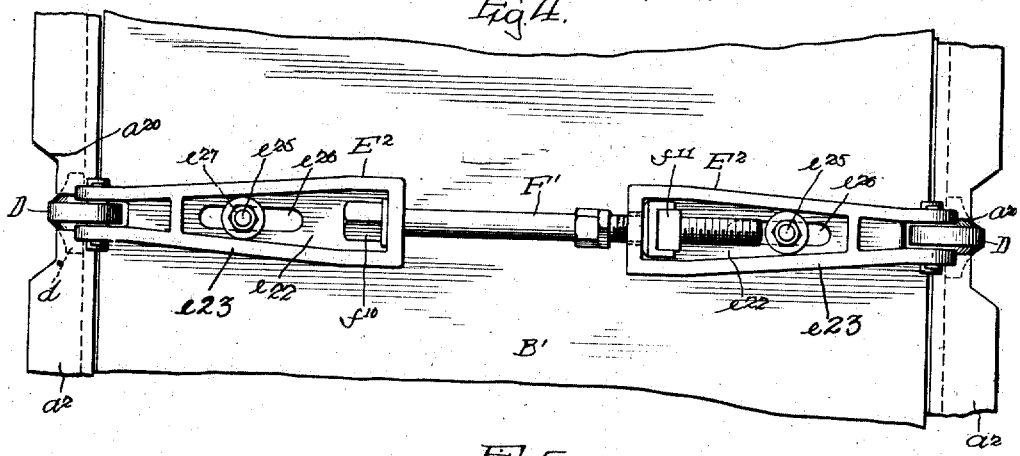
Figure 5:
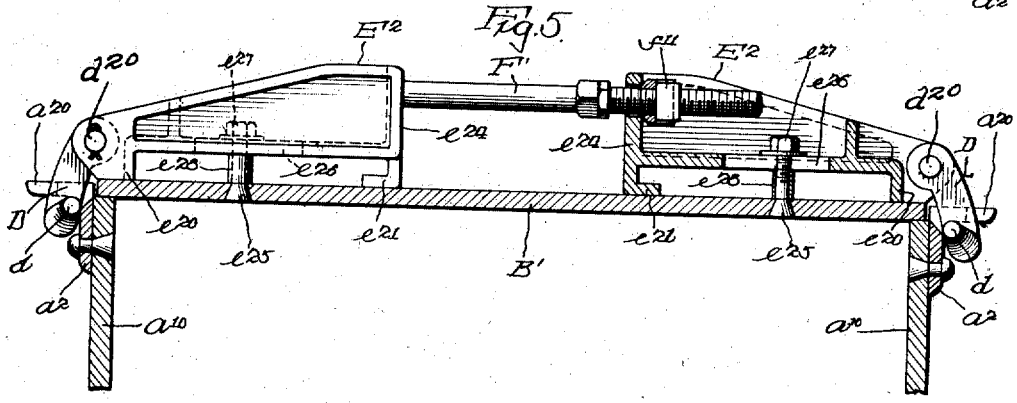
Figure 6:
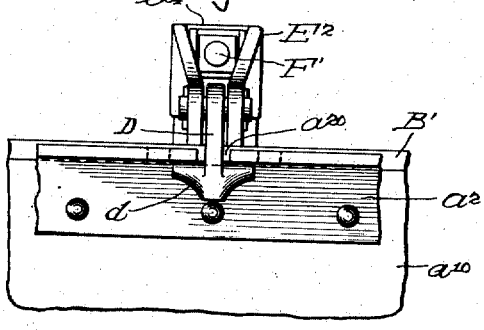

In the drawings: Fig. 1 is a section of a cylindrical receptacle equipped with the invention. Fig. 2 is a plan. Fig. 3 is a section taken on line 3—3 of Fig. 2. Fig. $3^a$ is a detail perspective of one of the toggle-links. Fig. $3^b$ is a perspective of one of the lugs for pivotally holding a toggle-link on the receptacle. Fig. 4 is a plan of the invention applied to a rectangular receptacle. Fig. 5 is a view, partly in section and partly in side elevation of the closure shown in Fig. 4. Fig. 6 is an end view of the construction shown in Fig. 5.

In Figs. 1 to $3^b$, the invention is exemplified with a tumbling receptacle or drum A which has a cylindrical body A′ which is provided with an opening $a$ through which the material and the articles to be treated may be delivered into and discharged from the receptacle. An arcuate door B is provided to close said opening and comprises an inner arcuate wall $b'$ fitting in the opening $a$ and an outer liner $b$ having its margins extended to lap the wall of the receptacle-body at the margins of said opening. Strips $a'$, fixed to the inner face of the receptacle-body, at the margins of the opening $a$, serve as stops for the inner face of the door-wall $b'$ and reinforce the receptacle-body at said margins.

Each closing device comprises a pair of aligned transversely extending adjustably connected complementary members or bars E which are removable with the door and a pair of toggle-links D pivoted to the outer ends of the members respectively and adapted for detachable connection to circumferentially aligned brackets C on the receptacle-body. Each bracket C has a base $c$ riveted or otherwise suitably secured to the outer periphery of the receptacle-body A′ adjacent the margins of the door, and a pair of integral outwardly opening hooks $c'$ with a space between them. Each link D has its distal or outer end adapted to fit into said space and an opening $c^2$ in the base $c$ of one bracket C, and has oppositely projecting integral studs or lugs $d$ adapted respectively to enter and seat in the hooks $c'$ on one of the brackets C. The other end of each link D is pivotally connected by a pin $d^2$ to the outer end of one of the cross-members E. Each member E comprises a transversely curved or arcuate base-wall $e$ extended at $e'$ to abut against the central portion of the door, and at $e^2$ to abut against the marginal portion of the door over the opening and over the portion of the door which laps the receptacle-body; pivot-lugs $e^3$ at its outer end in which pin $d^2$ is held and between which the toggle is confined longitudinally of the receptacle; side-walls $e^4$; and an inner end-wall $e^5$ having an opening $e^6$ therein; all of the elements of the member being integrally formed. Each member E is held in connected and transversely slidable relation to the door by a stud $e^7$ which is riveted to the door and extends through an elongated slot $e^8$ in the base-wall $e$, and a nut $e^9$ threaded to the outer end of the stud. A sleeve $e^{10}$, around the stud and confined between the liner $b$ of the door, and a washer $e^{11}$ on the stud limit the nut so the member will be free to slide around and on the outer face of the door. The adjustable connection between each complementary pair of members E consists of a bolt F with a shank $f$ extending through the openings $e^6$ in the inner end-walls of said members, a head $f'$ on one end of the bolt engaging the end-wall of one member, and a nut $f^2$ threaded to the other end of the bolt. By turning the bolt relatively to the nut $f^2$, the members may be drawn together by bolt-head $f'$ and nut $f^2$. A washer or clip $f^3$ is non-rotatably confined between the sides of one member E and locks the nut $f^2$ against rotation. Holes $f^4$ are formed in the sides of each member E to receive a suitable pin which may serve as a rest for a socket wrench, for convenience in turning the bolt-head $f'$. A nut $f^5$ and lock-nut $f^6$ may be provided on the bolt to limit the relative movement between the members so the bolt cannot be turned to subject the door to excessive inward stresses.

Several of these closing devices are usually applied to hold a door, the number depending upon its length, but since they are alike in construction, only one has been shown and described. The receptacle is provided with trunnions $k$ on its ends which are journalled in suitable stationary bearings (not shown) so the receptacle will be rotatable on its longitudinal axis.

The operation of the device will be as follows: When the door is separated from the receptacle, the member E will be spread apart. When the door has been lifted into its position in the opening $a$, the studs $d$ of the toggle-links D will be swung into interengagement with the hooks $c'$ of the brackets C respectively. Bolt $f$ will then be turned so its head $f'$ and nut $f^2$ will draw the inner ends of the members E together. This will cause the toggle-links to pivot in their seats in hooks $c'$ so their other ends and pivot-pins $d^2$ will swing inwardly and towards the wall of the receptacle and door. The slots $e^8$ permit the members to slide inwardly around the door as the bolt is tightened, and as a result, the abutments $e^2$ of the members will force the lapping portions of the margins of the door inwardly against the lapped portions of the receptacle-body so that the lapped portions of the door and receptacle will be firmly jammed together to form a tight closure. Simultaneously, the inner ends of abutments $e^2$ and abutments $e'$ will be drawn against the outer periphery of the door to reinforce it against internal impact intermediate and at its ends. When the door is thus secured, the closure-devices will secure it so it will be retained as an integral part of the receptacle, and will be well adapted to withstand the impact stresses to which it is subjected when the receptacle is rotated in the tumbling operation.

In the modified form of the invention shown in Figs. 4, 5 and 6, the improved closure is applied to a rectangular receptacle comprising a body with side-walls $a^{10}$ and having one side open. The door B′ is adapted to close the open side and to lap the edges of the side-walls $a^{10}$. Angle-iron bars $a^2$ are secured to the sides $a^{10}$ and are formed with notches $a^{20}$ to receive the studs $d$ of the toggle-links D, the studs being adapted to extend under the horizontal flanges of the bars so that they will be held in hooked engagement with the receptacle-body. Pins $d^{20}$ pivotally connect the links to the outer ends of the members $E^2$ respectively. Each member is provided adjacent its outer end with an abutment $e^{20}$ to bear against the outer face of one margin of door B′ and an abutment $e^{21}$ at its inner end to bear against the intermediate portion of the door. Each member E also comprises a base-wall $e^{22}$, sides $e^{23}$, and an inner end-wall $e^{24}$. A bolt F′, similar in construction to the bolt F, extends through holes in end-walls $e^{24}$, and is provided with a head $f^{10}$ and a locked nut $f^{11}$ adapted to draw the members $E^2$ together. Studs $e^{25}$, which are riveted to the door B′, extend through slots $e^{26}$ in the members $E^2$ respectively and are provided with nuts $e^{27}$ and sleeve $e^{28}$, forming sliding connections between the members and the door B′. When the bolts F′ is turned in one direction, to draw the inner ends thereof together, the pivots $d^{20}$ of toggle-links D will swing inwardly about studs $d$, thus causing the abutment $e^{20}$ to force the outer ends of the members against the edges of the sides $a^{10}$ of the receptacle, and simultaneously, the abutments $e^{21}$ will be forced inwardly so that the inner ends of the members will brace or reinforce the central portion of the door.

In either of the forms of the invention shown, when it is desired to obtain access to the receptacle, it is only necessary to turn the bolts to permit the members to spread until the toggle-links D can be swung out of engagement with the hooks on the receptacle-body.

The invention exemplifies a closure for receptacles in which the retaining devices are adapted to force the margins of the door into firm engagement with the margin of the receptacle-body, and also to draw them inwardly to brace or reinforce the central portion of the door.

The invention also exemplifies a door-securing device which is adapted for tumbling mills, in the use of which it is desirable to bodily remove or lift the door with the draw-connection on it, away from the receptacle so it can be loaded with materials to be operated on and so it can be rotated into position to discharge the materials.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. The combination with a rotatable receptacle having an opening therein, and a door for the opening having marginal engagement with the receptacle, of a door-securing device comprising a member outside of and movable relatively to and across the door, a link, pivotal connections between the link-ends and the member and receptacle respectively, one of which is detachable, the pivots being disposed so the connection with the member will swing inwardly toward the receptacle, and means carried by the door for shifting the member to swing the link inwardly to force the door against and into tight relation with the receptacle.

2. The combination with a rotatable receptacle having an opening therein, and a door for the opening having marginal engagement with the receptacle, of a door-securing device comprising a member outside of and slidably connected to the door, a link, pivotal connections between the link ends and the member and receptacle respectively, one of which is detachable, the pivots being disposed so the connection with the member will swing inwardly toward the receptacle, and adjustable means for shifting the member to swing the link inwardly to force the door against and into tight relation with the receptacle.

3. The combination with a rotatable receptacle having an opening therein, and a door for the opening having marginal engagement with the receptacle, of a door-securing device comprising a member outside of and movable relatively to and across the door, a link, a pivotal connection between one end of a link and the member, a pivotal detachable hook-connection between the other end of the link and the receptacle, the pivots being disposed so the connection with the member will swing inwardly toward the receptacle, and adjustable means for shifting the member to swing the link inwardly to force the door against and into tight relation with the receptacle.

4. The combination with a rotatable receptacle having an opening therein, and a door for the opening having marginal engagement with the receptacle, of a door-securing device comprising a pair of links, a draw-connection between the links, pivotal connections between the link-ends and the draw-connection and receptacle respectively, one of the connections for each link being detachable, the link-pivots being disposed so the pivots between the links and the draw connection will swing inwardly toward the receptacle, and means for operating the draw-connection to simultaneously swing the links inwardly to force the margins of the door against and into tight relation with the receptacle.

5. The combination with a rotatable receptacle having an opening therein, and a door for the opening having marginal engagement with the receptacle, of a door-securing device comprising a pair of links, a draw-connection between the links, slidably connected to the door, pivotal connections between the link-ends and the draw-connections and receptacle respectively, one of the connections for each link being detachable, the link-pivots being disposed so the pivots between the links and the draw-connections will swing inwardly toward the receptacle, and means for operating the draw-connection to simultaneously swing the links inwardly to force the margins of the door against and into tight relation with the receptacle.

6. The combination with a rotatable receptacle having an opening therein, and a door for the opening having marginal engagement with the receptacle, of a door-securing device comprising a pair of links, a draw-connection between the links, pivotal connections between the link-ends and the draw-connection and the receptacle respectively, pivotal detachable hook-connections between the links and the receptacle, the link pivots being disposed so the pivots between the links and the draw-connection will swing inwardly toward the receptacle, and means for operating the draw-connection to simultaneously swing the links inwardly to force the margins of the door against and into tight relation with the receptacle.

7. The combination with a rotatable receptacle having an opening therein, and a door for the opening having marginal engagement with the receptacle, of a door-securing device comprising a pair of members outside of and movable relatively to and across the door, a pair of links, pivotal connections between the link ends and the members and receptacle respectively, one of the connections for each link being detachable, the link pivots being disposed so the pivots between the links and the members will swing inwardly toward the receptacle, and adjustable means for drawing the members together to simultaneously swing the links inwardly to force the margins of the door against and into tight relation with the receptacle.

8. The combination with a rotatable receptacle having an opening therein, and a door for the opening having marginal engagement with the receptacle, of a door-securing device comprising a member outside of and movable relatively to and across the door, a link, pivotal connection between the link-ends and the member and receptacle respectively, one of which is detachable, the pivots being disposed so the connection with the member will swing inwardly toward the receptacle, and means for shifting the member to swing the link inwardly to force the door against and into tight relation with the receptacle, said member being provided with an abutment to engage and brace the door adjacent its central portion.

9. The combination with a rotatable receptacle having an opening therein, and a door for the opening having marginal engagement with the receptacle, of a door-securing device comprising a member outside of and movable relatively to and across the door, a link, pivotal connections between the link-ends and the member and receptacle respectively, one of which is detachable, the pivots being disposed so the connection with the member will swing inwardly toward the receptacle, and means for shifting the member to swing the link inwardly to force the door against and into tight relation with the receptacle, said member being provided with abutments to engage the door at its margin and adjacent its central portion.

10. The combination with a rotatable receptacle having an opening therein, and a door for the opening having marginal engagement with the receptacle, of a door-securing device comprising a member outside of and slidably connected to the door, a link, a pivotal connection between one end of the link and the member, a pivotal detachable hook-connection between the other end of the link and the receptacle, the pivots being disposed so the connection with the member will swing inwardly toward the receptacle, and adjustable means on the door for shifting the member to swing the link inwardly to force the door against and into tight relation with the receptacle, said member being provided with means to engage and brace the door adjacent its central portion.

11. The combination with a rotatable receptacle having an opening therein, and a door for the opening having marginal engagement with the receptacle, of a door-securing device comprising a member outside of and slidably connected to the door, a link, a pivotal connection between one end of the link and the member, a pivotal detachable hook-connection between the other end of the link and the receptacle, the pivots being disposed so the connection with the member will swing inwardly toward the receptacle, and adjustable means on the door for shifting the member to swing the link inwardly to force the door against and into tight relation with the receptacle, said member being provided with abutments to engage the marginal and central portions of the door.

12. The combination with a rotatable receptacle having an opening therein, and a door for the opening having marginal engagement with the receptacle, of a door-securing device comprising a pair of links, a draw-connection between the links, pivotal connections between the link-ends and the draw-connection and receptacle respectively, one of the connections for each link being detachable, the link-pivots being disposed so the pivots between the links and the draw-connection will swing inwardly toward the receptacle, and means for operating the draw-connection to simultaneously swing the links inwardly to force the margins of the door against and into tight relation with the receptacle, said draw-connection being provided with means to engage and brace a central portion of the door.

13. The combination with a rotatable receptacle having an opening therein, and a door for the opening having marginal engagement with the receptacle, of a door-securing device comprising a pair of links, a draw-connection between the links, pivotal connections between the link-ends and the draw-connection and receptacle respectively, one of the connections for each link being detachable, the link-pivots being disposed so the pivots between the links and the draw-connection will swing inwardly toward the receptacle, and means for operating the draw-connection to simultaneously swing the links inwardly to force the margins of the door against and into tight relation with the receptacle, said draw-connection being formed with abutments to engage the marginal and central portions of the door.

14. The combination with a rotatable receptacle having an opening therein, and a door for the opening having marginal engagement with the receptacle, of a door-securing device comprising a pair of links, a draw-connection between the links, slidably connected to the door, pivotal connections between the link-ends and the draw-connection and receptacle respectively, one of the connections for each link being detachable, the link-pivots being disposed so the pivots between the links and the draw-connection will swing inwardly toward the receptacle, and means for operating the draw-connection to simultaneously swing the links inwardly to force the margins of the door against and into tight relation with the receptacle, said draw-connection being provided with means to engage and brace a central portion of the door.

15. The combination with a rotatable receptacle having an opening therein, and a door for the opening having marginal engagement with the receptacle, of a door-securing device comprising a pair of links, a draw-connection between the links, slidably connected to the door, pivotal connections between the link-ends and the draw-connection and receptacle respectively, one of the connections for each link being detachable, the link-pivots being disposed so the pivots between the links and the draw-connection will swing inwardly toward the receptacle, and means for operating the door-connection to simultaneously swing the links inwardly to force the margins of the door against and into tight relation with the receptacle, said draw-connection being formed with abutments to engage the marginal and central portions of the door.

16. The combination with a rotatable receptacle having an opening therein and a door for the opening having marginal engagement with the receptacle, of a door-closing device comprising a pair of members outside of and movable relatively to and across the door, a pair of links, pivotal connections between the link ends and the members and receptacle respectively, one of the connections for each link being detachable, the link-pivots being disposed so the pivots between the links and the members will swing inwardly toward the receptacle, and means for drawing the members together to simultaneously swing the links inwardly to force the margins of the door against and into tight relation with the receptacle, the members being provided with abutments adjacent the door-margins and with abutments for engaging intermediate portions of the door.

17. The combination with a rotatable receptacle having an opening therein and a door for the opening having marginal engagement with the receptacle, of a door-closing device comprising a pair of members outside of and slidably connected to the door, a pair of links, pivotal connections between the link-ends and the members, hooks on the links for detachable connection to the receptacle, the link pivots being disposed so the pivots between the links and the members will swing inwardly toward the receptacle, and a screw for drawing the members together to simultaneously swing the links inwardly to force the margins of the door against and into tight relation with the receptacle.

18. The combination with a rotatable receptacle having an opening therein and a door for the opening having marginal engagement with the receptacle, of a door-closing device comprising a pair of members outside of and slidably connected to the door, a pair of links, pivotal connections between the link ends and the members and receptacle respectively, one of the connections for each link being detachable, the link pivots being disposed so the pivots between the links and the members will swing inwardly toward the receptacle, and a screw for drawing the members together to simultaneously swing the links inwardly to force the margins of the door against and into tight relation with the receptacle.

19. The combination with a receptacle having an opening therein and a door for closing the opening having marginal engagement with the receptacle, of a pair of links, means to pivotally connect one end of each link to the receptacle adjacent the opening, so its other end will swing inwardly, a pair of members pivoted to said other ends of the links, and movably connected to the door, and screw-means between the members for drawing them together.

20. The combination with a rotatable receptacle having an opening therein, and a door for the opening having marginal engagement with the receptacle, of a door-securing device comprising a member outside of and slidably connected to the door, a link, pivotal connections between the link ends and the member and receptacle respectively, one of which is detachable, the pivots being disposed so the pivot between the link and the member will swing inwardly toward the receptacle, and a screw for shifting the member to swing the link inwardly to force the door against and into tight relation with the receptacle.

21. The combination with a rotatable receptacle having an opening therein and a door for the opening having marginal engagement with the receptacle, of a door-closing device comprising a pair of members outside of and slidably connected to the door, a pair of links, pivotal connections between the link ends and the members and receptacle respectively, one of the connections for each link being detachable, the link pivots being disposed so the pivots between the links and the members will swing inwardly toward the receptacle and a screw for drawing the members together to simultaneously swing the links inwardly to force the margins of the door against and into tight relation with the receptacle, the members being provided with abutments adjacent the door-margins and with abutments for engaging the intermediate portion of the door.

22. The combination of a tumbling drum having a side-opening, a door for closing the opening, having marginal engagement with the receptacle, a longitudinally adjustable draw-connection extending transversely across the door, devices for connecting the ends of the draw-connection to the receptacle, at least one of said devices being detachable, and means for positively forcing the door inwardly against the receptacle when the draw-connection is connected to the receptacle and is shortened.

23. The combination of a tumbling drum adapted for rotation and having a side-opening, a door for closing the opening, having marginal engagement with the receptacle, a longitudinally adjustable draw-connection extending transversely across and mounted on the door, devices for connecting the ends of the draw-connection to the receptacle, at least one of said devices being detachable, and means for positively forcing the door inwardly against the receptacle when the draw-connection is connected to the receptacle and is shortened.

24. The combination of a tumbling drum adapted for rotation and having a side-opening, a door for closing the opening, having marginal engagement with the receptacle, a longitudinally adjustable draw-connection extending transversely across the door, devices for detachably connecting the ends of the draw-connection to the receptacle, and means for positively forcing the door inwardly against the receptacle when the draw-connection is shortened.

25. The combination of a tumbling drum adapted for rotation and having a side-opening, a door for closing the opening, having marginal engagement with the receptacle, a longitudinally adjustable draw-connection extending transversely across the door comprising a screw for adjusting the length of the connection, devices for connecting the ends of the draw-connection to the receptacle, at least one of said devices being detachable, and means for positively forcing the door inwardly against the receptacle when the connection is shortened.

26. The combination of a rotatable tumbling drum having a side opening, a door for closing the opening, having marginal engagement with the receptacle, elements on the receptacle adjacent the margins of the opening a longitudinally adjustable draw-connection extending transversely across the door, means for detachably connecting the ends of the draw-connection to said elements, and means for positively forcing the door inwardly when the draw-connection is connected to said elements and is shortened.

27. The combination of a rotatable tumbling drum having a side opening, a door for closing the opening, having marginal engagement with the receptacle, elements on the receptacle adjacent the margins of the opening, a longitudinally adjustable draw-connection extending transversely across and mounted on the door, means for connecting the ends of the draw-connection to said elements, and means for positively forcing the door inwardly when the draw-connection is connected to said elements and is shortened.

28. The combination of a rotatable tumbling drum having a side-opening, a door for closing the opening, having marginal engagement with the receptacle, elements on the receptacle adjacent the margins of the opening, a longitudinally adjustable draw-connection extending transversely across the door and comprising a screw for adjusting its length, means for connecting the ends of the draw-connection to said elements, and means for positively forcing the door inwardly when the draw-connection is connected to said elements and is shortened.

29. The combination of a rotatable tumbling drum having a side-opening, a door for closing the opening, having marginal engagement with the receptacle, elements on the receptacle adjacent the margins of the opening, a longitudinally adjustable draw-connection extending transversely across the door and comprising a screw for shortening the length of the connection, devices at the ends of and connected to the draw-connection, for engaging said elements, and means for positively forcing the door inwardly when the draw-connection is shortened.

30. The combination of a cylindrical tumbling drum having an opening in its side and a door forming a cylindrical section of the drum, having marginal engagement with the receptacle and for closing the opening, a longitudinally adjustable draw-connection extending transversely across the door, devices for connecting the ends of the draw-connection to the receptacle, and means for positively forcing the door inwardly against the receptacle when the connection is shortened.

31. The combination of a cylindrical tumbling drum having an opening in its side and a door forming a cylindrical section of the drum, having marginal engagement with the receptacle and for closing the opening, a longitudinally adjustable draw-connection extending transversely across and mounted on the door, devices for connecting the ends of the draw-connection to the receptacle, and means for positively forcing the door inwardly against the receptacle when the connection is shortened.

32. The combination of a cylindrical tumbling drum having an opening in its side and a door forming a cylindrical section of the drum, having marginal engagement with the receptacle and for closing the opening, a longitudinally adjustable draw-connection extending transversely across the door, devices for detachably connecting the ends of the draw-connection to the receptacle, and means for positively forcing the door inwardly against the receptacle when the connection is shortened.

33. The combination of a cylindrical tumbling drum having an opening in its side and a door forming a cylindrical section of the drum, having marginal engagement with the receptacle and for closing the opening, a longitudinally adjustable draw-connection extending transversely across the door and comprising a screw for adjusting the length of the connection, devices for connecting the ends of the draw-connection to the receptacle, and means for positively forcing the door inwardly against the receptacle when the connection is shortened.

34. The combination of a tumbling drum having a side opening, a door for closing the opening, having marginal engagement with the receptacle, a longitudinally adjustable draw-connection extending transversely across and mounted on the door, comprising members movable relatively to the door and a screw whereby the connection may be positively shortened, devices for detachably connecting the members to the receptacle, and means for positively forcing the door inwardly when the connection is shortened.

35. The combination of a tumbling drum having a side-opening, a door for closing the opening, having marginal engagement with the receptacle, a longitudinally adjustable draw-connection extending transversely across and mounted on the door and comprising a screw whereby the connection may be positively shortened, hook-devices for connecting the ends of the draw-connection to the receptacle comprising elements connected to the draw-connection and the receptacle respectively, the elements on the door being adapted to be drawn together when the connection is shortened, and means for positively forcing the door inwardly when the connection is shortened.

36. The combination of a tumbling drum having a side-opening, a door for closing the opening, having marginal engagement with the receptacle, a longitudinally adjustable draw-connection extending transversely across and mounted on the door and comprising a pair of members slidably mounted on the door and a screw whereby the members may be positively drawn together, devices for detachably connecting the members to the receptacle, and means for positively forcing the door inwardly when the members of the draw-connection are drawn together.

RAYMOND H. MOORE.
MAURICE F. BEETHAM.